United States Patent
Xu et al.

(10) Patent No.: US 11,331,737 B2
(45) Date of Patent: May 17, 2022

(54) DEVICE FOR INSULATING CATHODE SURFACE IN ELECTROCHEMICAL MACHINING

(71) Applicant: JIANGSU UNIVERSITY, Zhenjiang (CN)

(72) Inventors: Kun Xu, Zhenjiang (CN); Wenrong Shen, Zhenjiang (CN); Zhaoyang Zhang, Zhenjiang (CN); Hao Zhu, Zhenjiang (CN); Xueren Dai, Zhenjiang (CN); Qinming Gu, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 413 days.

(21) Appl. No.: 16/467,673

(22) PCT Filed: Jul. 6, 2018

(86) PCT No.: PCT/CN2018/094737
§ 371 (c)(1),
(2) Date: Jun. 7, 2019

(87) PCT Pub. No.: WO2019/237443
PCT Pub. Date: Dec. 19, 2019

(65) Prior Publication Data
US 2021/0339324 A1    Nov. 4, 2021

(30) Foreign Application Priority Data
Jun. 15, 2018  (CN) .......................... 201810622392.3

(51) Int. Cl.
*B23H 3/04*       (2006.01)
*B23K 26/352*   (2014.01)

(52) U.S. Cl.
CPC .......... *B23H 3/04* (2013.01); *B23H 2300/10* (2013.01); *B23K 26/352* (2015.10)

(58) Field of Classification Search
CPC .................................................. B23H 3/04–10
See application file for complete search history.

(56) References Cited

U.S. PATENT DOCUMENTS

| | | | | |
|---|---|---|---|---|
| 3,284,327 A | * | 11/1966 | Maeda ..................... | B23H 3/00 205/670 |
| 2002/0110726 A1 | | 8/2002 | Busse et al. | |
| 2015/0273603 A1 | * | 10/2015 | Mori ........................ | B23H 3/04 428/131 |

FOREIGN PATENT DOCUMENTS

| CN | 101579762 A | 11/2009 |
|---|---|---|
| CN | 104903040 A | 9/2015 |

OTHER PUBLICATIONS

Hu Manhong et al.; Experimental Study on Micro Electrochemical Machining with Hydrophobic Side Insulation Electrode; Nanotechnology and Precision Engineering, Department of Mechanics and Acoustics, National Institute of Metrology, Beijing 100013, China; State Key Laboratory of Tribology, Tsinghua University, Beijing 100084, China; vol. 11, No. 4, Jul. 2013.

* cited by examiner

*Primary Examiner* — Nicholas A Smith
(74) *Attorney, Agent, or Firm* — Heslin Rothenberg Farley & Mesiti, P.C.

(57) ABSTRACT

A device for insulating a cathode surface in electrochemical machining is provided. The cathode surface insulation device is characterized in that super-hydrophobic microstructures are prepared in regions to be insulated on the cathode surface, so as to realize selective insulation of the surface of the tool cathode, and thereby achieve objects of constraining an electrical field in the processing area, reduc- (Continued)

ing stray corrosion and side surface taper, and improving processing efficiency and accuracy.

5 Claims, 1 Drawing Sheet

DEVICE FOR INSULATING CATHODE SURFACE IN ELECTROCHEMICAL MACHINING

CROSS REFERENCE TO RELATED APPLICATIONS

This application is a U.S. National Phase filing under 35 U.S.C. § 371 of International Application PCT/CN2018/094737, filed Jul. 6, 2018. PCT/CN2018/094737 claims priority from Chinese Patent Application Number 201810622392.3, filed Jun. 15, 2018. The entire contents of each of these applications are hereby expressly incorporated herein by reference.

I. TECHNICAL FIELD

The present invention relates to the field of electrochemical machining, particularly to a device for insulating cathode surface in electrochemical machining.

II. BACKGROUND ART

Electrochemical machining is a material removal process based on electrochemical anodic dissolution, with advantages of high production efficiency, wide range of material processing, and high surface quality, free of residual stress and plastic deformation, and without tool wear, etc., and is widely used in aeronautics and astronautics, military and national defense, etc.

Owing to a fact that it is difficult to constrain the electric field in the processing area in electrochemical machining, the scattered electric field may easily lead to secondary corrosion of the workpiece, resulting in stray corrosion; moreover, the side clearance is often increased continuously and the side surface becomes tapered in processing the three-dimensional structure, which limit the accuracy of processing of high-precision three-dimensional structures by electrochemical machining. It is a common practice to reduce stray corrosion and side surface taper by insulating the electrode surface and constraining the electrical field to the tip of the electrode in electrochemical machining.

The electrode surface is insulated usually by adding a surface insulation film. However, various surface insulation methods often have disadvantages, for example, the insulation film may be dissolved and destroyed easily, the force of bonding to the substrate is weak, or the film producing procedures are complex and costly, etc. Super-hydrophobic surfaces exhibit outstanding performances in fields of self-cleaning, ice and frost prevention, fluid resistance reduction, oil-water separation, directional transfer of micro-droplets, anti-corrosion and anti-fouling, biomedical materials, etc., and have great application potentials. The present invention utilizes a characteristic that the gas on the super-hydrophobic surface can easily displace the liquid and forming an insulating gas film by adsorbing the gas on the super-hydrophobic surface, so as to realize the function of selective insulation of tool cathode in electrochemical machining.

III. CONTENTS OF THE INVENTION

The object of the present invention is to provide a reliable and convenient method for surface insulation requirements in electrochemical machining, i.e., a cathode surface insulation method in electrochemical machining, in which super-hydrophobic micro-structures are prepared on a surface to be insulated and an insulating gas film is generated on the surface by absorbing gas to the super-hydrophobic micro-structures to achieve insulation effect.

The present invention is achieved by the following technical scheme: A device for insulating cathode surface in electrochemical machining, comprises a tool cathode, a workpiece, an electrolyte tank, a power supply unit, and a moving mechanism, wherein, the electrolyte tank is disposed on a working platform, and electrolyte and the workpiece are disposed in the electrolyte tank; the workpiece and the tool cathode are connected to a positive pole and a negative pole of the power supply unit respectively; and the tool cathode is mounted on the moving mechanism via a cathode fixture; the moving mechanism is connected to a computer; the computer controls the movement of the moving mechanism.

Furthermore, super-hydrophobic structures are prepared on the outer surface of the tool cathode by laser scanning or electrochemical deposition or a combination of both.

Furthermore, the tool cathode is a hollow structure.

Furthermore, gas is passed through the tool cathode, and the gas is introduced into the inside of the tool cathode through the air pipe by means of a gas pump.

Furthermore, the super-hydrophobic structures can absorb gas bubbles in the electrolyte to form an insulating gas film, so as to realize the insulation of the outer surface of the tool cathode.

Furthermore, the power supply unit is a pulsed power supply unit.

Furthermore, tiny pores are arranged in the outer surface of a part of the tool cathode disposed in the electrolyte.

Benefits:

1. Super-hydrophobic structures are prepared in regions to be insulated on the tool cathode surface, the gas in the electrolyte is absorbed by using the gas adsorption effect of the super-hydrophobic structures under the liquid to form an insulating gas film, which realizes selective insulation of the tool cathode surface, and thereby achieves objects of constraining the electrical field in the processing area, reducing stray corrosion and side surface taper, improving processing efficiency and accuracy.

2. The super-hydrophobic structures attain the following effects: (1) absorbing gas bubbles and forming an insulating gas film; (2) maintaining the stability of the insulating gas film, and preventing the gas film from being damaged by electrolyte flushing or the like.

3. A hollow structure is formed inside the tool cathode, pores are distributed between the hollow cathode cavity and the super-hydrophobic surface, a gas pump conveys gas through a gas pipe into the hollow cathode, and the gas directly reaches the vicinity of the super-hydrophobic surface through the pores, so that a stable insulating gas film can be generated and maintained more easily.

IV. DESCRIPTION OF DRAWINGS

IN THE FIGURES

Figure 1:
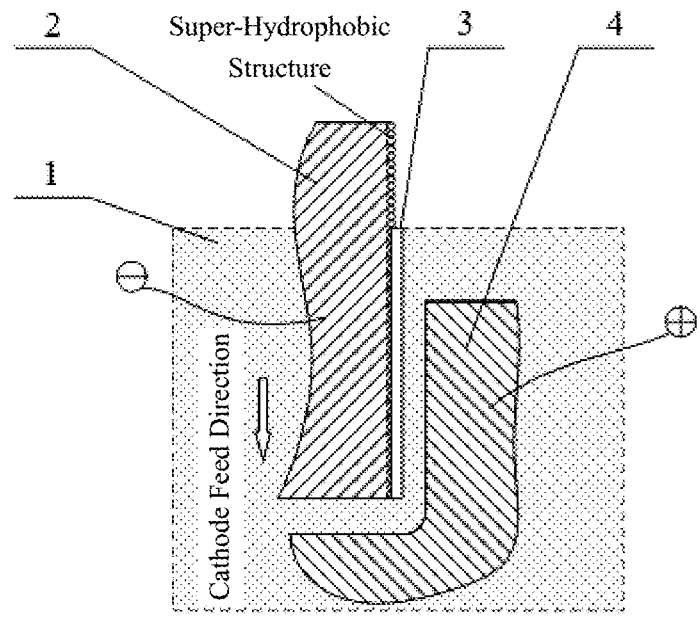
FIG. 1 is a schematic diagram of insulating cathode by using a super-hydrophobic side surface in electrochemical machining.

1—electrolyte; 2—tool cathode; 3—insulating gas film; 4—workpiece; 5—working platform; 6—electrolyte tank; 7—power supply unit; 8—gas pump; 9—gas pipe; 10—hollow cathode; 11—cathode fixture; 12—computer; 13—moving mechanism

V. EMBODIMENTS

Hereunder the present invention will be further detailed in embodiments with reference to the accompanying drawings, but the protection scope of the present invention is not limited to those embodiments.

A device for insulating cathode surface in electrochemical machining, comprises a tool cathode 2, a workpiece 4, an electrolyte tank 6, a power supply unit 7, and a moving mechanism 13, wherein, the electrolyte tank 6 is disposed on a working platform 5, and electrolyte 1 and the workpiece 4 are disposed in the electrolyte tank 6; the workpiece 4 and the tool cathode 2 are connected to a positive pole and a negative pole of the power supply unit 7 respectively; and the tool cathode 2 is mounted on the moving mechanism 13 via a cathode fixture 11; the moving mechanism 13 is connected to a computer 12; the computer 12 controls the movement of the moving mechanism 13. Super-hydrophobic structures are prepared on the outer surface of the tool cathode 2 by laser scanning or electrochemical deposition or a combination of both. The tool cathode 2 is a hollow structure. Gas is passed through the tool cathode 2, and the gas is introduced into the inside of the tool cathode 2 through the air pipe 9 by means of a gas pump 8. The super-hydrophobic structures can absorb gas bubbles in the electrolyte 1 to form an insulating gas film 3, and thereby realize the insulation of the outer surface of the tool cathode 2. The power supply unit 7 is a pulsed power supply unit. Tiny pores are arranged in the outer surface of the tool cathode 2 disposed in the electrolyte 1.

FIG. 1 is a schematic diagram of insulating cathode by using a super-hydrophobic side surface in electrochemical machining, which comprises electrolyte 1, a tool cathode 2, an insulating gas film 3, and a workpiece 4. Wherein, super-hydrophobic structures are prepared in regions to be insulated on the surface of a tool cathode 2, the gas bubbles in the electrolyte 1 are absorbed by the super-hydrophobic structures under the liquid to form an insulating gas film 3, so as to realize selective insulation of the surface of the tool cathode 2. In the electrochemical machining, the super-hydrophobic structures on the surface of the tool cathode 2 form an insulating gas film by absorbing the gas, so as to realize a function of selective insulation of the surface of the tool cathode 2. The gas bubbles may be hydrogen generated in the electrochemical reaction, or the gas aerated in the electrolyte in mixed-air electrochemical machining, or the gas conveyed from an auxiliary gas source to the surface of the cathode.

Figure 2:
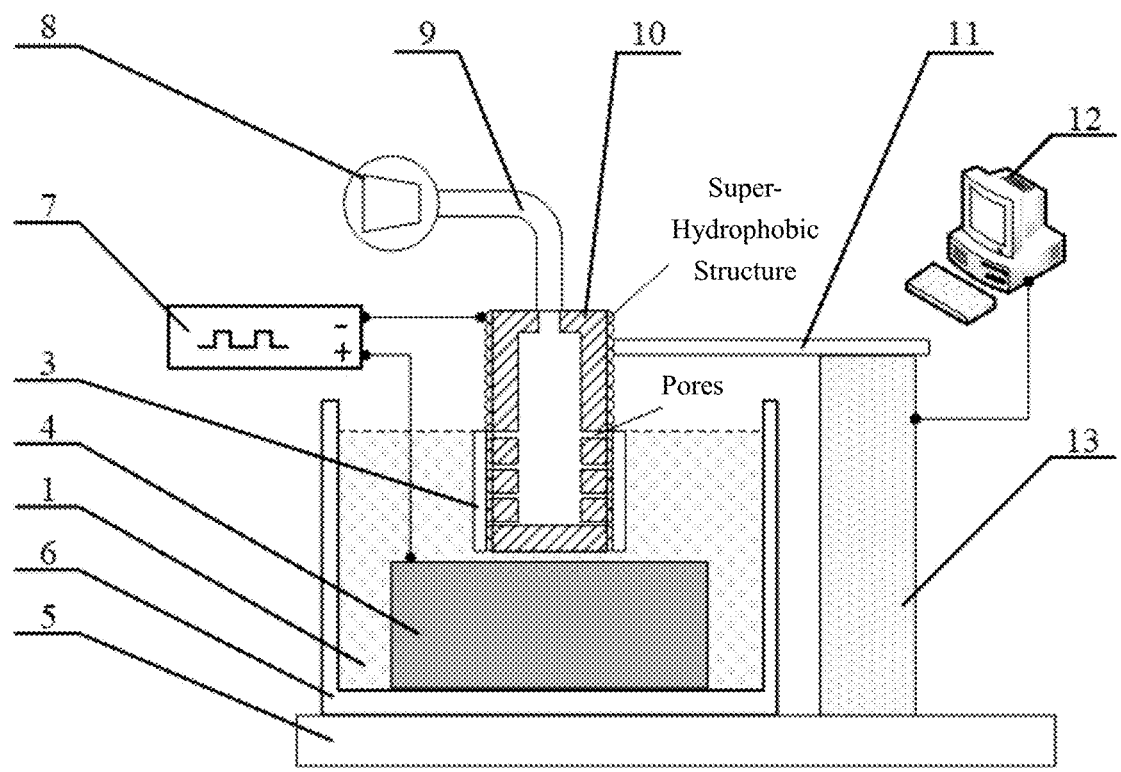
FIG. 2 is a schematic diagram of a system for insulating cathode by using a ventilation assisted super-hydrophobic side surface in electrochemical machining.

FIG. 2 is a schematic diagram of a system for insulating cathode with super-hydrophobic side surface assisted by a ventilation in electrochemical machining. The system comprises an electrolyte 1, an insulating gas film 3, a workpiece 4, a working platform 5, an electrolyte tank 6, a power supply unit 7, a gas pump 8, a gas pipe 9, a hollow cathode 10, a computer 12, a cathode fixture 11, and a moving mechanism 13. The electrolyte tank 6 and the moving mechanism 13 are mounted on the working platform 5, the workpiece 4 is mounted in the electrolyte tank 6, and an appropriate amount of the electrolyte 1 is charged into the electrolyte tank 6; the hollow cathode 10 is connected to the moving mechanism 13 via the cathode fixture 11, the moving mechanism 13 is controlled by the computer 12 to drive the hollow cathode 10 to move, so as to realize functions of tool setting, feeding, and processing etc.

Hereunder the working process will be briefly described below with reference to FIGS. 1 and 2:
Super-hydrophobic structures are prepared in regions to be insulated on the tool cathode (usually side surfaces), by means of one of laser etching, chemical etching, sol-gel method, anodic oxidation method, hydrothermal method, and electrochemical deposition, or a combination thereof; in addition, the super-hydrophobic structures do not change the macroscopic dimensions of the tool cathode.

During the operation, the tool cathode 2 is connected to the negative pole of the power supply unit 7, the workpiece 4 is connected to the positive pole of the power supply unit 7, hydrogen is generated on the cathode surface during the machining, the gas bubbles are absorbed by the surface of super-hydrophobic structures when they contact with the super-hydrophobic surface, and thereby an insulating gas film 3 is formed on the surface of the tool cathode 2, so as to realize selective insulation of the tool cathode 2.

In electrochemical machining, mixed-air electrochemical machining is a processing method that can improve processing accuracy. By aerating a certain proportion of gas into the electrolyte 1, the gas-liquid mixture enters into the machining gap, so that the machining gap tends to be uniform as a result of aeration, and thereby the repeated precision is improved. In mixed-air electrochemical machining, the gas in the electrolyte 1 not only includes hydrogen generated through the electrolytic reaction but also includes the aerated gas. The increase in the gas content is more advantageous for forming a stable insulating gas film 3 on the super-hydrophobic surface.

In electrochemical machining, the electrolyte flushing is often required to remove the processing products to be discharged and refresh the electrolyte, but the electrolyte flushing may affect the formation and maintenance of a stable insulating gas film 3. FIG. 2 provides a device for more easily forming and maintaining a stable insulating gas film 3, which comprises a gas pump 8, a gas pipe 9, and a hollow cathode 10. Pores are distributed between the cavity of the hollow cathode and the super-hydrophobic surface, the gas pump 8 conveys gas through the gas pipe 9 into the hollow cathode, and the gas directly reaches the vicinity of the super-hydrophobic surface through the pores, so that a stable insulating gas film can be generated and maintained easily.

Super-hydrophobic structures are prepared in regions to be insulated on the surface of the tool cathode 10, the gas bubbles in the electrolyte are absorbed by using the gas bubble adsorption effect of the super-hydrophobic structures under the liquid to form an insulating gas film 3, so as to realize the insulation of the surface of the tool cathode 10; the gas bubbles absorbed by the super-hydrophobic structures may be the gas generated at the cathode by the electrochemical reaction, or the gas aerated in the electrolyte in mixed-air electrochemical machining, or the gas added by means of an auxiliary device or apparatus, such as a gas pump.

When a tool cathode 10 that is a hollow structure with tiny pores distributed in the side surfaces is used, a gas pump 8 can be used to convey the gas through the tiny pores to the surface of the tool cathode 10, so as to form a stable insulating gas film 3 on the surfaces of the super-hydrophobic structures. The gas aerated into the electrolyte in mixed-air electrochemical machining or the gas added by means of an auxiliary device or apparatus (e.g., a gas pump) will not cause chemical reaction with the electrolyte, corrode the tool cathode and the workpiece, or destroy the super-hydrophobic structures.

Although the embodiments are some preferred embodiments of the present invention, the present invention is not limited to embodiments described above. Any obvious modifications, replacement, or variation that can be made by the person skilled in the art shall be deemed as within the protection scope of the present invention, without departing from the spirit of the present invention.

The invention claimed is:

1. A device for insulating cathode surface in electrochemical machining, comprising a tool cathode, a workpiece, an electrolyte tank, a power supply unit, and a moving mechanism, wherein the electrolyte tank is disposed on a working platform, and an electrolyte and the workpiece are disposed in the electrolyte tank; the work piece and the tool cathode are connected to a positive pole and a negative pole of the power supply unit respectively; and the tool cathode is a hollow structure and is mounted on the moving mechanism via a cathode fixture;

wherein gas is passed through the tool cathode, and the gas is introduced into the cavity of the tool cathode through an air pipe by means of a gas pump; and wherein the moving mechanism is connected to a computer and the computer controls the movement of the moving mechanism.

2. The device for insulating cathode surface in electrochemical machining according to claim 1, wherein super-hydrophobic structures are prepared on the outer surface of the tool cathode by laser scanning or electrochemical deposition or a combination of both.

3. The device for insulating cathode surface in electrochemical machining according to claim 2, wherein the super-hydrophobic structures can absorb gas bubbles in the electrolyte to form an insulating gas film, so as to realize the insulation of the outer surface of the tool cathode.

4. The device for insulating cathode surface in electrochemical machining according to claim 1, wherein the power supply unit is a pulsed power supply unit.

5. The device for insulating cathode surface in electrochemical machining according to claim 1, wherein tiny pores are arranged in the outer surface of a part of the tool cathode disposed in the electrolyte.

* * * * *